United States Patent

Inazawa et al.

[11] Patent Number: 5,872,156
[45] Date of Patent: Feb. 16, 1999

[54] METHOD FOR PRODUCING LOW-FUMING RIGID POLYURETHANE FOAM

[75] Inventors: Yasuo Inazawa; Kei Odani, both of Amagasaki, Japan

[73] Assignee: Sumitomo Bayer Urethane Ltd., Amagaski, Japan

[21] Appl. No.: 134,064

[22] Filed: Aug. 13, 1998

Related U.S. Application Data

[62] Division of Ser. No. 7,014, Jan. 14, 1998.

[30] Foreign Application Priority Data

Jan. 21, 1997 [JP] Japan ..................... 9-008410

[51] Int. Cl.$^6$ .......... C08G 18/18; C08G 18/32; C08G 18/34
[52] U.S. Cl. .......... 521/128; 521/164; 521/167; 521/173; 521/177
[58] Field of Search .................... 521/128, 164, 521/167, 173, 177

[56] References Cited

U.S. PATENT DOCUMENTS

| | | | |
|---|---|---|---|
| 4,077,920 | 3/1978 | Yukuta et al. ................ | 260/2.5 AM |
| 4,735,970 | 4/1988 | Sommerfeld et al. ........... | 521/128 |
| 5,026,737 | 6/1991 | Ohnuma et al. .............. | 521/78 |
| 5,648,019 | 7/1997 | White, III et al. ............ | 521/173 |
| 5,677,359 | 10/1997 | White, III et al. ............ | 521/173 |
| 5,684,057 | 11/1997 | White, III et al. ............ | 521/173 |

*Primary Examiner*—Morton Foelak
*Attorney, Agent, or Firm*—Joseph C. Gil; N. Denise Brown

[57] ABSTRACT

It is to provide a method for producing a low-fuming rigid polyurethane foam, which is superior in initial activity at low temperature and requires a small amount of a stock liquid.

A method for producing a rigid polyurethane foam, which comprises mixing (a) a polyisocyanate component with a polyol component comprising (b) a polyol mixture, (c) a catalyst and (d) a blowing agent, then foaming the mixture; wherein the polyisocyanate component (a) is polymethylenepolyphenyl polyisocyanate or a modified material thereof; the polyol mixture (b) comprises (b-1) an aromatic polyester polyol and (b-2) an aromatic polyether polyol; the catalyst (c) is at least one metallic catalyst; and the blowing agent (d) is an adduct of a primary or secondary amine compound with carbon dioxide.

1 Claim, No Drawings

METHOD FOR PRODUCING LOW-FUMING RIGID POLYURETHANE FOAM

This is a divisional application of U.S. Ser. No. 09/007,014, filed Jan. 14, 1998.

The present invention relates to a method for producing a low-fuming rigid polyurethane foam, which is superior in initial activity and requires a small amount of a raw material liquid. The rigid polyurethane foam of the present invention can be applied by spraying in excellent workability regardless of a change in temperature throughout the four seasons.

A rigid polyurethane foam is produced by mixing a polyisocyanate component with, as a polyol component, a compound having at least two reactive groups capable of reacting with an isocyanate group (particularly polyol), a catalyst, a flame retardant, a surfactant, a low-boiling point hydrochlorofluorocarbon such as HCFC-141b and water which reacts with the polyisocyanate to generate carbon dioxide, by a foaming machine.

In case of the spray foaming in a field of construction work, it is considerably difficult to adjust the temperature of a substrate. Particularly, in winter, when the foaming thickness is comparatively thin, an endothermic action due to low-temperature of the substrate occurs so that the heat evolution is insufficient and the density of the foam becomes comparatively high. At the same time, since the curing at the time of foaming proceeds slowly, a lateral elongation phenomenon of the foam occurs, which results in poor adhesion to the substrate.

In order to eliminate such a phenomenon, Japanese Patent Kokoku Publication No. 99533/1994 suggests use of a specific catalyst or use of a low-boiling point blowing agent in combination with the catalyst. However, in case of use in combination with only the specific catalyst, the foam density becomes high when the foaming thickness is comparatively thin. In order to handle the low-boiling point blowing agent of a gas at a normal temperature under a normal pressure, it is necessary to bring a cylinder into a field of foaming. Furthermore, when the metering precision of the blowing agent is not sufficiently controlled, the density becomes too high or too low. As a result, when the density becomes too high, the used amount of the raw material is increased. On the other hand, when the density becomes too low, shrinkage of the foam occurs.

As another method, an attempt of increasing an initial reactivity by using a foaming catalyst (catalyst which accelerates the reaction between water and isocyanate) is sometimes made, but the amount of the used foaming catalyst is limited in view of the cost, etc., as a matter of course.

Japanese Patent Kokai Publication No. 133398/1976 proposes a method for producing a flame-retardant, low-fuming polyurethane foam, which comprises blending amine carbamate of a primary or secondary amino compound having a hydroxyl group, and then forming the blend. However, according to this method, since the reaction proceeds too slowly, the workability (e.g. instantaneous foaming and curing) required for the in-situ foaming (spray) is not satisfied. As the isocyanate, TDI (toluene diisocyanate) is used (see Examples) and is unsuitable for spray foaming.

Japanese Patent Kokai Publication No. 220512/1987 discloses a method for producing an insulating polyurethane foam for refrigerator, using a special amine/carbon dioxide adduct. However, this method is not suitable for spray because of poor reactivity (long gelling time).

The present invention provides a method for producing a low-fuming rigid polyurethane foam which is superior in initial activity in low-temperature atmosphere and gives a low-density foam.

The present invention provides a method for producing a rigid polyurethane foam, which comprises mixing (a) a polyisocyanate component with a polyol component comprising (b) a polyol mixture, (c) a catalyst, (d) a blowing agent and, if necessary, a flame retardant and a surfactant, then foaming the mixture;

wherein the polyisocyanate component (a) is polymethylenepolyphenyl polyisocyanate or a modified material thereof;

the polyol mixture (b) comprises:
(b-1) 40 to 90 parts by weight of an aromatic polyester polyol having a hydroxyl value of 170 to 350 mg KOH/g;
(b-2) 10 to 50 parts by weight of at least one aromatic polyether polyol having a hydroxyl value of 170 to 600 mg KOH/g, which is produced by using an aromatic amine, a Mannich base having an aromatic ring or a polyfunctional phenol as a starting material; and
(b-3) not more than 30 parts by weight of an alkanolamine having no aromatic ring and/or a polyether polyol having no aromatic ring, and a hydroxyl value of the polyol mixture (b) is from 170 to 400 mg KOH/g;

the catalyst (c) is at least one metallic catalyst, which is optionally used in combination with a tertiary amine compound, and the blowing agent (d) is an adduct of a primary or secondary amine compound with carbon dioxide, which is optionally used in combination with a low-boiling point compound and/or water.

The present invention also provides a polyol composition comprising (b) a polyol mixture, (c) a catalyst, (d) a blowing agent and, if necessary, a flame retardant and a surfactant;

wherein the polyol mixture (b) comprises:
(b-1) 40 to 90 parts by weight of an aromatic polyester polyol having a hydroxyl value of 170 to 350 mg KOH/g;
(b-2) 10 to 50 parts by weight of at least one aromatic polyether polyol having a hydroxyl value of 170 to 600 mg KOH/g, which is produced by using an aromatic amine, a Mannich base having an aromatic ring or a polyfunctional phenol as a starting material; and
(b-3) not more than 30 parts by weight of an alkanolamine having no aromatic ring and/or a polyether polyol having no aromatic ring, and a hydroxyl value of the polyol mixture (b) is from 170 to 400 mg KOH/g;

the catalyst (c) is at least one metallic catalyst, which is optionally used in combination with a tertiary amine compound; and the blowing agent (d) is an adduct of a primary or secondary amine compound with carbon dioxide, which is optionally used in combination with a low-boiling point compound and/or water.

The present invention will be explained in detail hereinafter.

The polyisocyanate component (a) used in the present invention is (i) polymethylenepolyphenyl polyisocyanate or (ii) a product prepared by modifying polymethylenepolyphenyl polyisocyanate and/or diphenylmethane diisocyanate (MDI) as a raw material according to a known method. The polyisocyanate component (a) is generally polymethylenepolyphenyl polyisocyanate, but a mixture of modified polymethylenepolyphenyl polyisocyanate and polymethylenepolyphenyl polyisocyanate may be used.

The modification may be urethanization, carbodiimidation, trimerization and the like. The urethanized polymethylenepolyphenyl polyisocyanate is a reaction product obtained by reacting polymethylenepolyphenyl polyisocyanate or MDI with polyol and/or monool (e.g. molar ratio of NCO to OH=1000/1 to 10/5). The carbodiimidated polymethylenepolyphenyl polyisocyanate is a compound having a carbodiimide group and/or a uretone-imine group, which is made by carbodiimidating 0.1 to 20% by weight of isocyanate groups by using a known carbodiimidating catalyst. The trimerized polymethylenepolyphenyl polyisocyanate is a compound wherein isocyanate groups are trimerized in the amount of 1 to 20% by weight based on isocyanate groups of the starting material, which is made by a known trimerization technique. The modified material may be a mixture thereof.

In the present invention, the polyol mixture (b) is used. The polyol mixture (b) is a mixture of (b-1) an aromatic polyester polyol, (b-2) an aromatic polyether polyol and, if necessary, (b-3) an alkanolamine having no aromatic ring and/or a polyether polyol having no aromatic ring.

The aromatic polyester polyol (b-1) is a reaction product of a polyhydric alcohol, preferably a dihydric alcohol and/or a trihydric alcohol with a polybasic, preferably dibasic polycarboxylic acid having an aromatic ring.

In order to form a polyester polyol, a corresponding polycarboxylic anhydride or a corresponding carboxylate ester of a lower alcohol or a mixture thereof can be used in place of a free polycarboxylic acid. The polycarboxylic acid may be an aromatic polycarboxylic acid and/or a heterocyclic polycarboxylic acid, and it may be a polycarboxylic acid substituted with a halogen atom.

Examples of the polycarboxylic acid include phthalic acid, isophthalic acid, terephthalic acid, trimellitic acid, pyromellitic acid, anhydrous phthalic acid and derivatives thereof. The polyhydric alcohol is preferably an alcohol having 3 to 9 carbon atoms, and may be anyone of a straight-chain, branched or cyclic alcohol. The polyhydric alcohol is preferably a dihydric alcohol and/or a trihydric alcohol. Examples of the dihydric alcohol include ethylene glycol, propylene glycol, butanediol, pentanediol, hexanediol, cyclohexanediol and the like. Examples of the trihydric alcohol include glycerine, trimethylolpropane and the like. Those prepared by decomposing polyethylene terephthalate with various glycols may also be used.

In the present invention, an aromatic polyester polyol prepared by decomposing polyethylene terephthalate with various glycols is preferred.

A hydroxyl value of the aromatic polyester polyol (b-1) is from 170 to 350 mg KOH/g, preferably from 200 to 300 mg KOH/g. If the hydroxyl value is smaller than 170 mg KOH/g, the viscosity of the aromatic polyester polyol is high and, therefore, it is difficult to handle it. If the hydroxyl value is larger than 350 mg KOH/g, the strength of the foam is low. An average number of functional groups of the aromatic polyester polyol is preferably from 2.1 to 3.6, more preferably from 2.2 to 3.0.

An amount of the used aromatic polyester polyol (b-1) is from 40 to 90 parts by weight, preferably from 50 to 80 parts by weight, based on 100 parts by weight of the polyol mixture (b). If the amount is smaller than 40 parts by weight, a fuming concentration ($C_A$ value) defined in JIS (Japanese Industrial Standard) A 1321 becomes high when the foam is burned. If the amount is larger than 90 parts by weight, the viscosity of the aromatic polyester polyol itself is high, and the viscosity of the polyol component becomes high. Therefore, when the spraying is conducted, the pattern did not extend, which results in poor workability.

The polyol mixture (b) contains the aromatic polyether polyol (b-2). The aromatic polyether polyol (b-2) is a polyether polyol produced from an aromatic amine, a Mannich base having an aromatic ring, or a polyfunctional phenol as the starting material.

The polyether polyol produced by using the aromatic amine is a polyol prepared by adding at least one alkylene oxide such as ethylene oxide and propylene oxide to at least one aromatic polyamine such as tolylenediamine and diphenylmethanediamine.

The Mannich polyol is a polyol prepared by adding an alkylene oxide to a Mannich reaction product obtained by phenols, alkanolamines and formaldehyde, and examples thereof include DK Polyol 3773 (manufactured by Daiichi Kogyo Seiyaku Co., Ltd.).

The aromatic polyether polyol (b-2) may be a polyether polyol produced by using a polyfunctional phenol as the starting material. Examples thereof include a resol type condensate prepared by condensing phenols with excess formaldehydes in the presence of an alkaline catalyst, a benzylic ether type initial condensate prepared by reacting in an non-aqueous system in case of synthesizing the resol type condensate, and a novolac type condensate prepared by reacting excess phenols with formaldehydes in the presence of an acidic catalyst. A molecular weight of the condensate is preferably from about 200 to 10,000. Phenols also include those wherein a substituent other than the hydroxyl group is bonded to the benzene nucleus.

Examples of the phenols include phenol, cresol, bisphenol A, resorcinol and the like. Examples of the formaldehydes include formalin, paraformaldehyde and the like.

A hydroxyl value of the aromatic polyether polyol (b-2) is preferably from 170 to 600 mg KOH/g, more preferably from 170 to 450 mg KOH/g. An amount of the used aromatic polyether polyol (b-2) is from 10 to 50 parts by weight, preferably from 20 to 40 parts by weight, particularly from 30 to 40 parts by weight, based on 100 parts by weight of the polyol mixture. If the amount is smaller than 10 parts by weight, the adhesion to the substrate is liable to be deteriorated. If the amount is larger than 50 parts by weight, the curing of the foam proceeds slowly.

The polyol mixture (b) may contain the alkanolamine having no aromatic ring and/or polyether polyol having no aromatic ring (b-3). The component (b-3) is optionally used for adjusting the viscosity and reactivity of the polyol mixture (b). Examples of the component (b-3) include an alkanolamine, a polyether polyol and the like, which are obtained by adding a cyclic ether, particularly propylene oxide, ethylene oxide or butylene oxide to polyhydric alcohols, saccharides, amines and the like. An amount of the component (b-3) is not larger than 30 parts by weight, preferably not larger than 18 parts by weight. If the amount is larger than 30 parts by weight, the $C_A$ value defined in JIS A 1321 is deteriorated.

The catalyst (c) is at least one metallic catalyst.

The metallic catalyst may be a metal carboxylate. The metal carboxylate is represented by the general formula:

wherein R represents an alkyl, alkenyl or aryl group having 1 to 17 carbon atoms; and X represents sodium, potassium or lead.

If the number of carbon atoms of R is not smaller than 18, the catalyst is hardly dissolved in water and therefore is not suitable for practical use. The metallic catalyst is preferably potassium octylate, lead octylate or potassium acetate.

An amount of solid material in the used metallic catalyst is from 0.1 to 7 parts by weight, preferably from 0.1 to 5 parts by weight, based on 100 parts by weight of the polyol mixture (b). Those prepared by dissolving the metallic catalyst in a short chain diol may be preferably used. As the short chain diol, diethylene glycol and dipropylene glycol are preferred.

Two or more types of metallic catalysts may be mixed.

The catalyst (c) may contains a tertiary amine catalyst, if necessary. As the tertiary amine catalyst, there can be used an amine catalyst which is generally known. In view of the odor and safety/sanitation, those having low vapor pressure are preferred.

Examples of the tertiary amine catalyst include N,N,N', N'-tetramethylhexamethylenediamine, N,N',N''- tris (dimethylaminopropyl)hexahydro-s-triazine, triethylenediamine, N,N,N',N'-tetramethylpropylenediamine, N,N,N',N'-pentamethyldiethylenetriamine, trimethylaminoethylpiperazine, N,N'-dimethylcyclohexylamine, bis(2-dimethylaminoethyl)ether, N-methylmorpholine, N-ethylmorpholine and the like. Preferred are N,N',N''-tris(dimethylaminopropyl) hexahydro-s-triazine and triethylenediamine. An amount of the used tertiary amine catalyst is not larger than 20 parts by weight, more preferably from 0.1 to 10 parts by weight, particularly from 2 to 5 parts by weight, based on 100 parts by weight of the polyol mixture (b).

The blowing agent (d) is an adduct of an amine compound having a primary or secondary amino group and carbon dioxide. Examples of the amine compound include an amine compound such as butylamine, ethylenediamine, hexamethylenediamine, diethylenetriamine and triethylenetetramine and an alkanolamine such as ethanolamine, N-methylethanolamine, diethanolamine, isopropanolamine and diisopropanolamine. Among them, an amine compound having a hydroxyl group is preferred.

An amount of the used adduct of the amine compound having a primary or secondary amino group with carbon dioxide is from 0.1 to 30 parts by weight based on 100 parts by weight of the polyol mixture (b).

Since the reaction liquid of this adduct is liable to solidifies at a normal temperature, it is preferred that a liquid polyol and/or water is previously added to the amine compound.

The blowing agent (d) may contain a low-boiling point compound and/or water, if necessary. Examples of the low-boiling point compound include hydrocarbon, halogenated hydrocarbon and the like. It is possible to use a low-boiling point compound having a boiling point within the range from −50° to 100° C. (under 1 atm).

An amount of the used blowing agent (d) may be within the range from 0.1 to 60 parts by weight based on 100 parts by weight of the polyol mixture (b).

In the present invention, various additives such as a flame retardant and a surfactant may be used, in addition to the components (a) to (d).

In the present invention, an isocyanate index is preferably from 130 to 280, particularly from 150 to 250.

In the present invention, it is preferred to produce a rigid polyurethane foam by a spray method. The rigid polyurethane foam may be used for insulatin, materials used in house, building, etc., for a refrigerator, for a lagging container, for a bathtub, and for a building interior/exterior material.

The following Examples further illustrate the present invention in detail.

REFERENCE EXAMPLE 1
Production of blowing agent

N-methylethanolamine (6.57 kg) and water (1.50 kg) were charged in a 10 L pressure reactor equipped with a rotating blade, followed by stirring. After a carbon dioxide bomb equipped with a pressure-reducing valve was connected to this reactor, carbon dioxide having a pressure reduced to 2 atm was fed into the liquid part with stirring. The temperature raised to about 90° C. in about 3 hours and then slowly decreased. The reaction liquid was drawn from the reactor after 8 hours from the beginning of the feed of carbon dioxide, and then the amount was measured. As a result, it was 9.8 kg. This reaction liquid maintained a liquid form at a normal temperature and an abnormal evolution of carbon dioxide was not observed even if the reaction liquid was heated to 80° C. Therefore, it could be stored as such in a 20 L tin-plated can. This reaction liquid was used as the blowing agent.

REFERENCE EXAMPLE 2
Production of blowing agent

In the same manner as in Reference Example 1, N-methylethanolamine (3.90 kg) was charged, followed by stirring. After 1 hour from the beginning of the feed of carbon dioxide, the temperature raised to about 90° C. and then slowly decreased. The reaction liquid was drawn from the reactor after 4 hours from the beginning of the feed of carbon dioxide, and then the amount was measured. As a result, it was 4.8 kg. This reaction liquid maintained a liquid form at a normal temperature after drawing but it solidified with heat revolution after standing at a normal temperature. When the reaction liquid (100 g) and a polyether polyol (polyol F described hereinafter) (400 g) were mixed again with heating to 60° C., the solid was converted into a liquid. This liquid was used as the blowing agent.

REFERENCE EXAMPLE 3
Production of blowing agent

The drawn reaction liquid (4.8 kg) obtained by operating in the same manner as in Reference Example 2 was mixed with previously warmed ethylene glycol (14.4 kg). The resulting mixed liquid maintained a liquid form at a normal temperature and an abnormal evolution of carbon dioxide was not observed even if the reaction liquid was heated to 80° C. Therefore, it could be stored as such in a 20 L tin-plated can. This mixed liquid was used as the blowing agent.

REFERENCE EXAMPLE 4
Production of blowing agent

In the same manner as in Reference Example 1, dimethylaminopropylamine (3.5 kg) and water (0.9 kg) were charged, followed by stirring. The liquid temperature raised to about 90° C. in about 10 minutes and then slowly decreased. The reaction liquid was drawn from the reactor after 8 hours from the beginning of the feed of carbon dioxide, and then the amount was measured. As a result, it was 4.9 kg. This reaction liquid maintained a liquid form at a normal temperature and an abnormal evolution of carbon dioxide was not observed even if the reaction liquid was heated to 80° C. Therefore, it could be stored as such in a 20 L tin-plated can. This mixed liquid was used as the blowing agent.

Examples 1 to 7 and Comparative Examples 1 to 3

A polyol, a catalyst, a flame retardant, a surfactant, a blowing agent (those obtained in Reference Examples and fluorinated hydrocarbon) and, if necessary, water were mixed to obtain a polyol component. The polyol component and isocyanate were sprayed on a substrate by a spray foaming machine equipped with a D gun (PF-1600, manufactured by Higaki Machinery Co.) to form a rigid polyurethane foam. The ingredients of the sprayed composition are shown in Table 1.

The spray foaming conditions were as follows.

| Spray foaming conditions | |
|---|---|
| Liquid temperature | 45° C. |
| Air pressure | 5 kg/cm² G |
| Ejection pressure | 70 kg/cm² G (initial setting) |

The following evaluations were conducted.

Cream time (initial activity) [Test A]

At the ambient temperature of room temperature (about 30° C.), a spray liquid was instantaneously sprayed on an aluminum plate having the temperature controlled to 0° C., and then the time required for the spray liquid to turn white on the aluminum plate (cream time) was measured.

Spray pattern, froth-state, lateral elongation, core density and dimensional stability [Test B]

A releasing agent was applied and dried on a veneer plywood of 90 cm×90 cm ×12 mm, and then a spray liquid was sprayed on the veneer plywood in the atmosphere at 0° C. so that the thickness of the primary spray layer was about 2 mm. After 30 seconds, the spraying was conducted so that the final thickness was about 30 mm to form a sample.

At that time, the situation of spraying from the gun to the veneer plywood was observed. Then, it was visually evaluated whether the spray pattern extends in a round shape (good), or does not extend or is divided into two parts (poor). Furthermore, it was visually evaluated whether the spray pattern becomes a frothy (good) or not (poor). Furthermore, it was observed whether the foam overflows the veneer plywood or not, and then the presence or absence of the lateral elongation of the foam was evaluated.

The upper and lower skins were removed from the resulting sample and the core density was measured. In order to compare the dimensional stability of the foam, the core density was measured and the sample was allowed to stand for 24 hours under the conditions of −30° C., 100° C. and 70° C.×95% R.H. and the amount of deformation (($V_1-V_0$)/$V_0$×100) (wherein $V_0$ represents a volume before exposing to each condition and $V_1$ represents a volume after exposing to each condition) was determined.

Amount of used stock liquid [Test C]

In the atmosphere at 0° C., a primary spraying was conducted on a slate plate of 50 cm×50 cm×6 mm in a thickness of about 2 mm, followed by spraying so that the total thickness of the foam was 10 mm. Then, the thickness of the resulting foam was measured (average value (n=10) was determined) and the amount of a stock liquid used per 1 m² was determined.

Fuming concentration ($C_A$) [Test D]

In the atmosphere at 0° C., a primary spraying was conducted on a slate plate of 30 cm×30 cm×6 mm in a thickness of about 2 mm, followed by spraying so that the total thickness of the foam was 25 mm. Before the measurement, the slate plate was cut into a size of 22 cm×22 cm. Then, $C_A$ was measured according to JIS A 1321.

TABLE 1

Amount (parts by weight)

| | Example | | | | | | |
|---|---|---|---|---|---|---|---|
| | 1 | 2 | 3 | 4 | 5 | 6 | 7 |
| Sumidur 44V10 | 177 | 179 | 171 | 173 | 169 | 175 | 186 |
| Polyol A | 70 | 80 | 60 | 60 | 70 | 60 | 70 |
| Polyol B | 10 | 10 | 30 | 30 | 20 | | |
| Polyol C | | | | | | 20 | |
| Polyol D | | | | | | | 20 |
| Polyol E | 20 | | 10 | | 10 | | |
| Polyol F | | 10 | | 10 | | 20 | 10 |
| Catalyst A | 0.8 | 1.0 | 0.7 | 0.6 | 0.5 | 0.7 | 0.7 |
| Catalyst B | | | | | 1.2 | | 1.0 |
| Catalyst C | 6.4 | 8.0 | 5.7 | 4.8 | 4.8 | 6.4 | 5.0 |
| Catalyst D | 4.0 | 5.0 | 3.6 | 3.0 | 2.7 | 3.5 | 4.0 |
| Flame retardant | 20 | 20 | 20 | 20 | 20 | 20 | 20 |
| Water | | 0.5 | | 0.1 | | 0.1 | 0.6 |
| Surfactant | 0.5 | 0.5 | 0.5 | 0.5 | 0.5 | 0.5 | 0.5 |
| Reference Example 1 | | | | | 5 | | |
| Reference Example 2 | | 5 | | | | 5 | 15 |
| Reference Example 3 | 5 | | | 5 | | | |
| Reference Example 4 | | | 5 | | | | |
| R-141b | 36 | 35 | 31 | 35 | 30 | 35 | 35 |

TABLE 2

Amount (parts by weight)

| | Comparative Example | | |
|---|---|---|---|
| | 1 | 2 | 3 |
| Sumidur 44V10 | 173 | 177 | 180 |
| Polyol A | 95 | 35 | |
| Polyol B | | 55 | |
| Polyol C | | | 60 |
| Polyol D | | | |
| Polyol E | 5 | | |
| Polyol F | | 10 | 40 |
| Catalyst A | 0.7 | 0.8 | 1.0 |
| Catalyst B | | | 1.3 |
| Catalyst C | 7.5 | 6.4 | 8.0 |
| Catalyst D | 5.5 | 4.0 | 5.5 |
| Flame retardant | 20 | 20 | 20 |
| Water | | | 0.5 |
| Surfactant | 0.5 | 0.5 | 0.5 |
| Reference Example 1 | | | |
| Reference Example 2 | | 5 | |
| Reference Example 3 | | | 5 |
| Reference Example 4 | | | |
| R-141b | 35 | 36 | 34 |

Isocyanate: Sumidur 44V10 NCO content: 31.6%, viscosity: 110 mPa.s/25° C.

Polyol A: Terol 250 (manufactured by Oxid Co.) polyester polyol having a hydroxyl value of 250 mg KOH/g and a viscosity of 5,000 mPa.s/25° C.

Polyol B: polyether polyol having a hydroxyl value of 320 mg KOH/g and a viscosity of 2,100 mPa.s/25° C., prepared by adding ethylene oxide and propylene oxide to tolylenediamine Polyol C: DK polyol 3773 (manufactured by Daiichi Kogyo Seiyaku Co., Ltd.) polyether polyol having a hydroxyl value of 470 mg KOH/g and a viscosity of 11,000 mPa.s/25° C.

Polyol D: polyether polyol having a hydroxyl value of 280 mg KOH/g and a viscosity of 12,000 mPa.s/25° C., prepared by adding ethylene oxide to bisphenol A Polyol E: polyether polyol having a hydroxyl value of 420 mg KOH/g and a viscosity of 220 mPa.s/25° C., prepared by adding ethylene oxide to triethanolamine Polyol F: polyether polyol having a hydroxyl value of 500 mg KOH/g and a viscosity of 85 mPa.s/25° C., prepared by adding ethylene oxide to monoethylamine Catalyst A: mineral spirit solution of lead octylate (lead content: 20% by weight)

Catalyst B: dipropylene glycol solution of triethylenediamine (TEDA) (TEDA content: 33% by weight)

Catalyst C: diethylene glycol solution of potassium octylate (potassium content: 15% by weight)

Catalyst D: N,N',N"-tris(dimethylaminopropyl) hexahydro-s-triazine

Flame retardant: tris(β-chloropropyl) phosphate

Surfactant: F348 manufactured by Shinetsu Kagaku Kogyo Co, Ltd.

R-141b: dichlorofluoroethane

According to the method of the present invention, there can be produced a low-fuming rigid polyurethane foam in a state of high initial activity without causing a lateral elongation of the foam, in good workability and small amount of a stock liquid, even if the temperature of a substrate is low such as 0° C. in the atmosphere having 10° C. or less.

What is claimed is:

1. A method for producing a rigid polyurethane foam, which comprises mixing (a) a polyisocyanate component with a polyol component comprising (b) a polyol mixture, (c) a catalyst, (d) a blowing agent and, if necessary, a flame retardant and a surfactant, then foaming the mixture;

wherein the polyisocyanate component (a) is polymethylenepolyphenyl polyisocyanate or a modified material thereof;

the polyol mixture (b) comprises:

(b-1) 40 to 90 parts by weight based on 100 parts by weight of the polyol mixture (b), of an aromatic polyester polyol having a hydroxyl value of 170 to 350 mg KOH/g;

(b-2) 10 to 50 parts by weight based on 100 parts by weight of the polyol mixture (b), of at least one aromatic polyether polyol having a hydroxyl value of 170 to 600 mg KOH/g, which is produced by using

TABLE 3

| | | Example 1 | 2 | 3 | 4 | 5 | 6 | 7 |
|---|---|---|---|---|---|---|---|---|
| Test A | Cream time (second) | 0–1 | 0–1 | 0–1 | 0–1 | 0–1 | 0–1 | 0–1 |
| Test B | Spray pattern | Good | Good | Good | Good | Good | Good | Good |
| Test B | Froth state | Good | Good | Good | Good | Good | Good | Good |
| Test B | Lateral elongation | None | None | None | None | None | None | None |
| Test B | Core density (kg/m³) | 30.8 | 30.6 | 30.4 | 30.7 | 31.0 | 31.2 | 31.0 |
| Test B | Dimensional stability | | | | | | | |
| | –30° C. × 24 hr (vol %) | –5 | –3 | –4 | –5 | –4 | –4 | –4 |
| | 100° C. × 24 hr (vol %) | 7 | 7 | 7 | 8 | 8 | 8 | 7 |
| | 70° C. × 95% RH × 24 hr (vol %) | 4 | 3 | 4 | 4 | 5 | 3 | 4 |
| Test C | Amount of used stock liquid (kg/m²) | 0.9 | 0.9 | 0.9 | 0.9 | 0.9 | 0.9 | 0.9 |
| Test D | $C_A$ | 120 | 123 | 125 | 120 | 115 | 115 | 114 |

TABLE 4

| | | Comparative Example | | |
|---|---|---|---|---|
| | | 1 | 2 | 3 |
| Test A | Cream time (second) | 2 | 0–1 | 0–1 |
| Test B | Spray pattern | Poor | Good | Good |
| Test B | Froth state | Poor | Good | Good |
| Test B | Lateral elongation | Yes | None | None |
| Test B | Core density (kg/m³) | 31.4 | 30.9 | 31.5 |
| Test B | Dimensional stability | | | |
| | –30° C. × 24 hr (vol %) | –12 | –8 | –5 |
| | 100° C. × 24 hr (vol %) | 10 | 10 | 8 |
| | 70° C. × 95% RH × 24 hr (vol %) | 7 | 6 | 5 |
| Test C | Amount of used stock liquid (kg/m²) | 1.3 | 0.9 | 0.9 |
| Test D | $C_A$ | 135 | 180 | 210 | an aromatic amine, a Mannich base having an aromatic ring or a polyfunctional phenol as a starting material; and (b-3) not more than 30 parts by weight based on 100 parts by weight of the polyol mixture (b), of an alkanolamine having no aromatic ring and/or a polyether polyol having no aromatic ring, and a hydroxyl value of the polyol mixture (b) is from 170 to 400 mg KOH/g;

the catalyst (c) is at least one metallic catalyst, which is optionally used in combination with a tertiary amine compound; and the blowing agent (d) is an adduct of a primary or secondary amine compound with carbon dioxide, which is optionally used in combination with a low-boiling point compound and/or water.

* * * * *